United States Patent [19]

Kröck et al.

[11] 4,294,578
[45] Oct. 13, 1981

[54] COLORANTS

[75] Inventors: Friedrich W. Kröck, Cologne; Rütger Neeff, Leverkusen, both of Fed. Rep. of Germany

[73] Assignee: Bayer Aktiengesellschaft, Leverkusen, Fed. Rep. of Germany

[21] Appl. No.: 20,867

[22] Filed: Mar. 15, 1979

[30] Foreign Application Priority Data

Mar. 17, 1978 [DE] Fed. Rep. of Germany ....... 2811718

[51] Int. Cl.$^3$ .......................... D06P 3/04; D06P 1/24
[52] U.S. Cl. ........................................... 8/516; 8/517; 8/638; 8/643; 8/676; 8/680; 8/917; 8/924; 260/374
[58] Field of Search ................... 8/39 B, 54, 516, 517, 8/643, 676, 924, 638, 917; 260/374

[56] References Cited

U.S. PATENT DOCUMENTS

| | | | |
|---|---|---|---|
| 1,875,191 | 8/1932 | Koch | 260/374 |
| 1,877,900 | 9/1932 | Kronholz et al. | 260/374 |
| 2,042,757 | 6/1936 | Zahn et al. | 260/374 |
| 2,453,285 | 11/1948 | von Allmen et al. | 260/371 |
| 2,494,240 | 1/1950 | Gutzwiller | 260/374 |
| 2,659,736 | 11/1953 | von Allmen et al. | 260/374 |

OTHER PUBLICATIONS

Venkataraman, K., "The Chemistry of Synthetic Dyes", vol. V, (Academic Press), 1971, pp. 63–64, 78 and 81.

*Primary Examiner*—A. Lionel Clingman
*Attorney, Agent, or Firm*—Sprung, Felfe, Horn, Lynch & Kramer

[57] ABSTRACT

Use of compounds which, in the form of the free acid, correspond to the formula

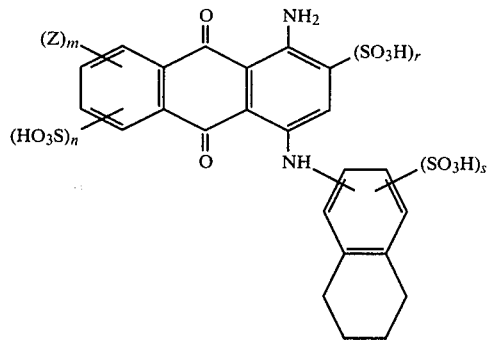

in which
Z represents halogen or alkylcarbonylamino with 1–4 C atoms in the alkyl radical,
m is 0, 1 or 2 and
n, r and s represent the numbers 0 or 1 with the proviso that the sum of n, r and s has a value of 1 or 2 and s can be 1 only if r at the same time is 0, for dyeing polymeric materials containing amide groups, material dyed in this way and colorants containing the compounds of the indicated formula.

4 Claims, No Drawings

COLORANTS

The present invention relates to the use of compounds which, in the form of the free acid, correspond to the formula

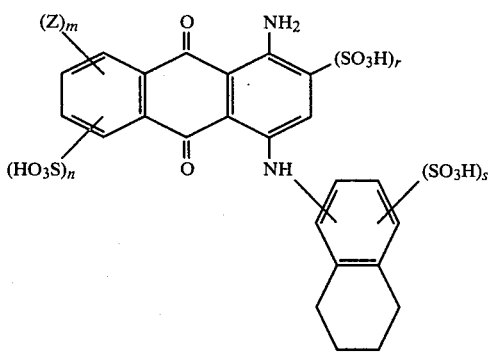

in which

Z represents halogen or alkylcarbonylamino with 1-4 C atoms in the alkyl radical, m is 0, 1 or 2 and n, r and s represent the numbers 0 or 1, with the proviso that the sum of n, r and s has a value of 1 or 2 and s can be 1 only is r at the same time is 0, when dyeing polymeric materials containing amide groups and to colorants containing a compound according to formula I. Z preferably represents fluorine, chlorine or acetylamino. n is preferably 0.

The use of the dyestuff of the formula

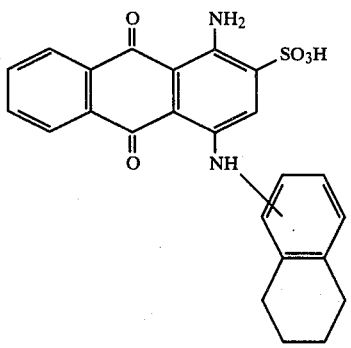

merits particular interest.

The dyestuffs are prepared in a known manner by reacting anthraquinones of the formula

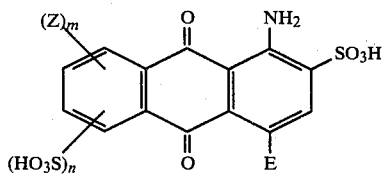

wherein

E represents a substituent replaceable in amination reactions and preferably represents halogen, such as chorine or bromine, and Z, m and n have the abovementioned meaning, with 5- or 6-amino-1,2,3,4-tetrahydro-naphthalene, it also being necessary, in some cases, to effect desulphonation and/or sulphonation in a conventional manner.

5- and 6-amino-1,2,3,4-tetrahydro-naphthalene are known [Schroeder, Liebigs Ann. Chem. 426, 19 et seq.].The condensation reaction of compounds of the formula II with 5- and 6-amino-tetralin and the desulphonation or sulphonation are carried out according to known processes [see, for example, Ullmanns Encyclop$UM/a/$ die der Techn. Chemie, (Ullmanns Encyclopaedia of Industrial Chemistry), 4th edition, page 585 et seq.)].

The compounds of the formula I are particularly suitable for dyeing and printing natural and synthetic fibre materials containing amide groups, for example materials of wool, silk and polyamides such as poly-$\epsilon$-caprolactam or condensation products of adipic acid and hexamethylenediamine.

The fibre materials can be in very diverse stages of processing, for example in the form of filaments, flocks or slubbings, in the form of piece goods, such as woven fabrics or mixtures, or in the form of made-up goods. In addition, it is also possible to carry out bulk dyeing of plastics containing amide groups.

Dyeing or printing can be carried out according to processes which are in themselves known, from water or from organic solvents. Either the pure dyestuffs or dyestuff mixtures can be used.

The invention also relates to colorants which contain one or more compounds of the formula I. These colorants can be obtained in a conventional manner, optionally by mixing compounds of the formula I with conventional diluents, such as, for example, formulating agents and solvents, and/or additives, such as, for example, additives conferring solubility, levelling agents, wetting agents, dispersing agents and anti-dusting agents.

The dyestuffs can be introduced into the dye liquor in the form of the dyestuff powder or, particularly advantageously, in the form of a concentrated dyestuff solution.

In dyestuff powders and in print pastes, the dyestuffs can be in diverse forms, for example in the form of alkali metal salts, such as lithium, sodium or potassium salts, or in the form of ammonium salts, and also in the form of alkyl-, dialkyl-, trialkyl- or tetraalkyl-ammonium salts, in which the alkyl groups have 1 to 12 carbon atoms and can optionally be substituted by hydroxyl groups, or also in the form of free acids, optionally in a finely divided state.

Dyestuff solutions are obtained, for example, by dissolving the dyestuff acid and/or the dyestuff salts in water and/or organic solvents, such as formamide, dimethylformamide, ethylene glycol, diethylene glycol, ethylene glycol monomethyl or monoethyl ether or diethylene glycol monomethyl, monoethyl, monopropyl or -isopropyl ether, optionally with the addition of assistants, such as urea, thiourea or dispersing agents.

If dyestuff salts are used, suitable salts are, for example, lithium salts, sodium salts, potassium salts, ammonium salts and optionally substituted ammonium salts, such as are obtained, for example, by reacting the dyestuff acids with amines such as alkanolamine, for example mono-, di- or tri-ethanolamine, mono- or di-isopropanolamine or tris-[($\beta$-hydroxy-ethoxy)-ethyl]-amine.

Dyeing with the dyestuffs according to the invention is carried out from neutral aqueous dyebaths or from aqueous dyebaths which constitute a weakly acid medium as a result of the addition of customarily used acids, such as formic acid, acetic acid or sulphuric acid, and which optionally contain customary dyeing assistants.

The resulting dyeings have good fastness to light and wet processing.

EXAMPLE 1

(a) 100 g of fibre material of polyamide 6 are dyed in a dyebath consisting of 4,000 ml of water, 1 ml of acetic acid (60% by volume) and 1 g of the dyestuff from Example 1d. The bath is heated to the boil in the course of 30 minutes and dyeing is carried out for a further 60 minutes at the boil. The material is then rinsed with cold water and dried and a brilliant blue dyeing with very good fastness to wet processing and to light is obtained.

Similar dyeings are obtained on other synthetic and natural polyamides, such as polyamide 66, polyamide 610, polyamide 11, wool or silk.

(b) 30 g of the duestuff obtained according to Example 1d are dissolved in hot water. 80 g of thiodiethylene glycol and 50 g of urea are added and the solution is stirred into 500 g of crystal gum thickener. A solution of 15 g of ammonium sulphate in water is then added and the mixture is made up to 1 l with water. Using this printing recipe, a fabric of polyamide 66 is printed in the conventional manner by the roller or screen printing process and dried and the print is fixed for 30 minutes in a star ager at 110° C. After customary finishing by soaping and rinsing, a clear blue print with very good fastness to light and wet processing is obtained.

Similar prints are obtained on other synthetic or natural polyamides, such as polyamide 6, polyamide 610, polyamide 11, wool or silk.

(c) A dyebath is prepared from 1 g of the dyestuff obtained according to Example 1d, 10 g of sodium sulphate, 2 ml of acetic acid (60% strength by volume) and 4 l of water. 100 g of wool are introduced into this dyebath at 40° C., the bath is heated to 100° C. in the course of 30 minutes and dyeing is carried out for 60 minutes at 100° C. After rinsing and drying, a clear blue dyeing with good fastness to wet processing and to light is obtained.

The dyestuff which is used in the preceding examples and which, in the form of the free acid, corresponds to the formula

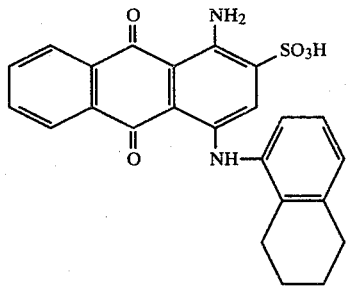

was prepared as follows:

(d) 404 g of 1-amino-4-bromo-anthraquinone-2-sulphonic acid in the form of the sodium salt are introduced into a solution of 264 g of sodium bicarbonate in 3,500 ccs of water. A solution of 164 g of 5-amino-1,2,3,4-tetrahydro-naphthalene in 1,750 ccs of methanol is added to this mixture, whilst stirring vigorously, and a solution of 12 g of copper-I chloride in 120 g of saturated sodium chloride solution with the addition of a few milliliters of concentrated hydrochloric acid is added dropwise to the resulting mixture at 45° C. in the course of about 45 minutes and whilst passing nitrogen over the mixture. The reaction mixture is then heated to 75°–80° C. and stirred at this temperature until all of the starting material has been converted (about 2 hours). The dyestuff formed crystallises out and is filtered off at 50°–60° C. and washed with water at 50° C. until the filtrate is pale blue. It is then washed with hot water acidified with hydrochloric acid until the filtrate is colourless, rinsed with a little cold water and dried. Yield 320 g, corresponding to 71% of theory.

The resulting dyestuff powder can be used for dyeing direct or after mixing with salts of strong bases and weak acids or after dissolving in alkali and salting out.

EXAMPLE 2

(a) 0.1 g of the dyestuff obtained according to Example 2c is dissolved in 100 ml of hot water, 5 ml of 10% strength ammonium acetate solution are added and the mixture is diluted to a volume of 500 ml with water. 10 g of polyamide 6 fibre are introduced into the dyebath, the dyebath is brought to the boil in the course of 20 minutes, 4 ml of 10% strength acetic acid are added and the bath is kept at the boil for one hour. The fibre is then rinsed and dried at 70°–80° C.

A clear, greenish-tinged blue dyeing with high fastness to wet processing and very good fastness to light is obtained.

Corresponding dyeings with similarly good fastness properties are also obtained on other synthetic and natural polyamides, such as polyamide 66, polyamide 610, polyamide 11, wool or silk.

(b) 100 g of wool are introduced into a dyebath consisting of 1 g of the dyestuff obtained according to Example 2c, 10 g of sodium sulphate, 2 ccs of acetic acid (60% strength by volume) and 4 l of water at a temperature of 40° C. The bath is heated to 100° C. in the course of 30 minutes and is kept at 100° C. for 60 minutes. After rinsing and drying, a clear, greenish-tinged blue dyeing with high fastness to wet processing and good fastness to light is obtained.

The dyestuff which is used in the preceding examples and which, in the form of the free acid, corresponds to the formula

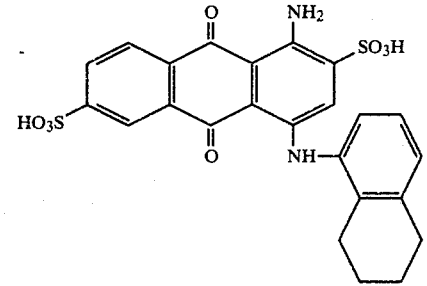

was prepared as follows:

(d) 23.1 g of 1-amino-4-bromo-anthraquinone-2,6-disulphonic acid are introduced into 325 ccs of water, the pH of the solution is adjusted to 7 by adding sodium hydroxide solution and 8 g of anhydrous sodium carbonate are added.

A solution of 8.1 g of 5-amino-1,2,3,4-tetrahydronaphthalene in 33 ccs of methanol is added, the mixture is heated to 45° C. and a solution of 0.5 g of copper-I chloride in 5 g of saturated sodium chloride solution and 0.1 cc of concentrated hydrochloric acid is added dropwise in the course of 45 minutes, under nitrogen. The mixture is then heated at 80° C. until all of the starting material has been converted. The reaction mixture is then cooled and acidified with half-concentrated hydrochloric acid. The dyestuff which has crystallised out is filtered off and washed carefully with dilute hydrochloric acid and then with a little water and dried. Yield: 19.8 g, corresponding to 75% of theory.

The resulting dyestuff powder can be used for dyeing direct or after mixing with salts of strong bases and weak acids or after dissolving in alkali and salting out.

EXAMPLES 3 to 19

Reddish-tinged to greenish-tinged blue dyeings are produced on natural and synthetic polyamides by a procedure analogous to that described in Examples 1 and 2, using the dyestuffs of Example 3-19, which are prepared as described above.

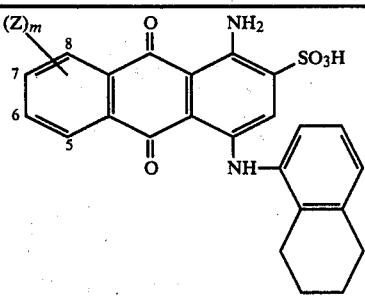

| Example No. | $(Z)_m$ | Example No. | $(Z)_m$ |
|---|---|---|---|
| 3 | 6-Cl | 7 | 7-F |
| 4 | 7-Cl | 8 | 6,7-Di-F |
| 5 | 6,7-Di-Cl | 9 | 5-CH$_3$—CO—NH— |
| 6 | 6-F | 10 | 5-C$_2$H$_5$—CO—NH— |
| | | 11 | 5-C$_4$H$_9$—CO—NH— |

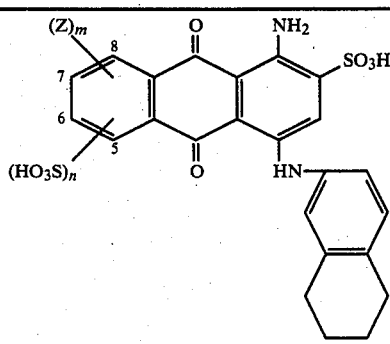

| Example No. | $(Z)_m$ | n |
|---|---|---|
| 12 | 6-Cl | 0 |
| 13 | 7-Cl | 0 |
| 14 | 6,7-Di-Cl | 0 |
| 15 | 6-F | 0 |
| 16 | 6,7-Di-F | 0 |
| 17 | 5-CH$_3$CONH— | 0 |
| 18 | H | 0 |
| 19 | H | 1(6-SO$_3$H) |

(20) Reddish-tinged to greenish-tinged blue dyeings are also obtained on natural and synthetic polyamides by a procedure analogous to that described in Examples 1 and 2, using the dyestuffs prepared according to Example 20.

(a) 9 g of the dyestuff obtained according to Example 1d are dissolved in 200 ccs of water with the addition of 2 g of NaOH. 11.2 g of glucose are added, under nitrogen, and the mixture is heated at 90° C. until all of the starting material has been converted. The product is filtered off hot and washed with hot water until the filtrate is colourless. After drying, 6.3 g, corresponding to 85% of theory, of a dyestuff of the formula

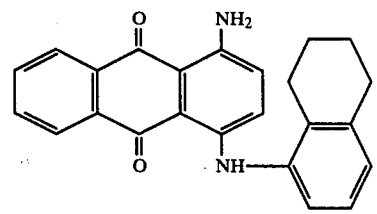

are obtained.

(b) 6 g of the dyestuff obtained according to Example 20a are introduced into 60 ccs of 100% strength sulphuric acid at 10° C. and the solution is stirred at not more than 20° C. until, after about 3 hours, all of the starting material has been converted. The reaction mixture is then discharged into 600 ccs of ice-water and the dyestuff which has precipitated is filtered off, washed carefully with water until virtually neutral and dried. Yield: 6.2 g, corresponding to 84% of theory, of the dyestuff of the formula

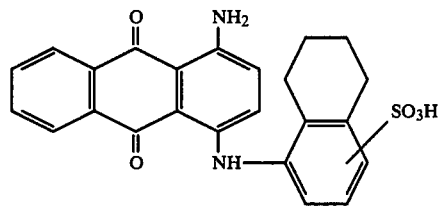

which dyes polyamide fibres, in accordance with the instructions given in Example 1a–c and 2 a and b, in blue shades with a good spectrum of fastness properties.

(c) 9 g of the dyestuff obtained according to Example 1d are suspended in a solution of 4.2 g of sodium carbonate in 420 ccs of water, 4.6 g of sodium dithionite and then 6.4 g of sodium hydroxide are added at 30°–35° C. and the mixture is stirred at this temperature until, according to a thin layer chromatogram, all of the starting material has disappeared. The product is filtered off, washed until neutral and dried. Yield: 6.2 g, corresponding to 83% of theory, of a dyestuff which is identical to that obtained according to Example 20a.

If the sodium carbonate and sodium hydroxide in the above instructions are replaced by 24 ccs of 25% strength ammonia, the same dyestuff is obtained in similarly good yield and purity.

The dyestuff thus obtained can also be sulphonated in accordance with the instructions given in Example 20b.

(d) If, for example, the dyestuff from Example 2c, 3, 5, 6, 12, 15, 18 and 19 are desulphonated in accordance with instructions 20a or 20c and the dyestuffs thus obtained are sulphonated as described in 20b dyestuffs are again obtained which dye natural and synthetic polyamide fibres in blue shades with good fastness to wet processing and to light.

The dyestuffs obtained by desulphonation of the dyestuffs of Examples 2c and 19 already carry a sulphonic acid group and can therefore optionally also be used, for the dyeing process in the form of the dyestuffs which have not subsequently been sulphonated.

We claim:

1. A polymeric material containing amide groups dyed with a dye which, in the form of the free acid, corresponds to the formula

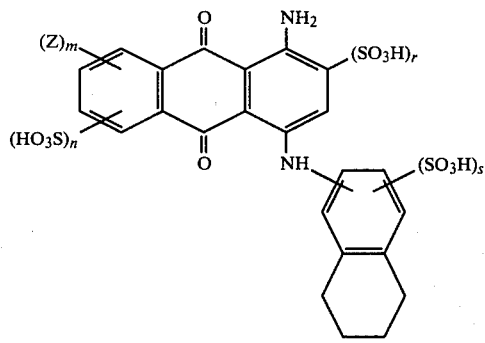

in which

Z represents halogen or alkylcarbonylamino with 1–4 C atoms in the alkyl radical, m is 0, 1 or 2 and n, r and s represent the numbers 0 or 1, with the proviso that the sum of n, r and s has a value of 1 or 2 and s can be 1 only if r at the same time is 0.

2. A polymeric material according to claim 1 dyed with a dye which, in the form of the free acid, corresponds to the formula

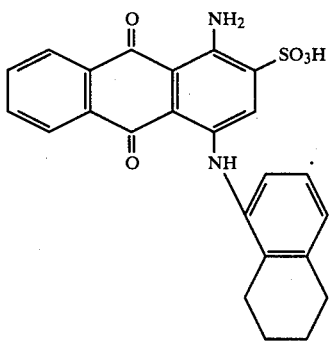

3. A polymeric material according to claim 1 which is dyed with a dye which, in the form of the acid, corresponds to the formula

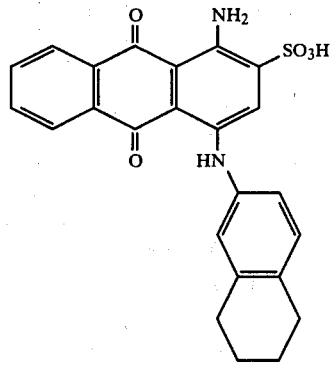

4. A polymeric material according to claim 1 which is dyed with a mixture of dyes which dyes in their free acid form correspond to the following formulae

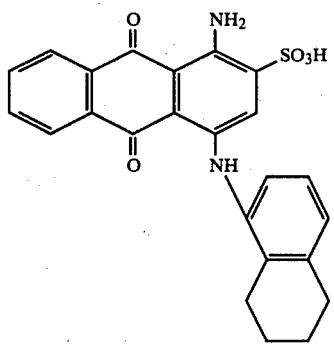

and

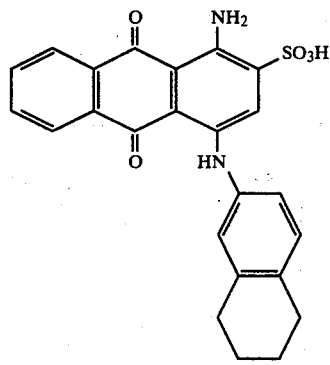

* * * * *